United States Patent [19]

Patti

[11] Patent Number: 4,766,930
[45] Date of Patent: Aug. 30, 1988

[54] CHECK VALVE WITH SELF-GUIDED SHUTTER IN THE VALVE BODY

[75] Inventor: Vincenzo Patti, Brescia, Italy

[73] Assignee: ITAP S.p.A., Italy

[21] Appl. No.: 70,567

[22] Filed: Jul. 7, 1987

[30] Foreign Application Priority Data

Jun. 3, 1987 [IT] Italy .................................. 7030/87[U]

[51] Int. Cl.⁴ ............................................. F16K 15/02
[52] U.S. Cl. .............................. 137/540; 137/543.21; 251/358
[58] Field of Search ........................... 137/540, 543.21; 251/358

[56] References Cited

U.S. PATENT DOCUMENTS

| | | | |
|---|---|---|---|
| 2,670,759 | 3/1954 | St. Clair | 137/540 |
| 3,025,874 | 3/1962 | Yocum | 137/540 |
| 3,145,724 | 8/1964 | Pelzer | 137/543.21 X |
| 4,244,395 | 1/1981 | Griswold | 137/540 X |

*Primary Examiner*—Robert G. Nilson
*Attorney, Agent, or Firm*—McGlew and Tuttle

[57] ABSTRACT

A fluid-delivery check valve is described, in which the body and a sleeve threaded thereon define a chamber with inlet and outlet ports therein. A plate shutter interacts with the valve seat and has peripherically thereof guiding wings which are positioned parallel to the axis of the shutter and slide on the inner surface of the chamber. The specific design of the shutter prevents oblique positioning of the valve stem and simplify the structure and operation of the valve.

4 Claims, 1 Drawing Sheet

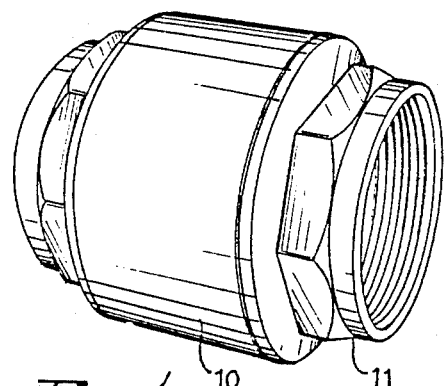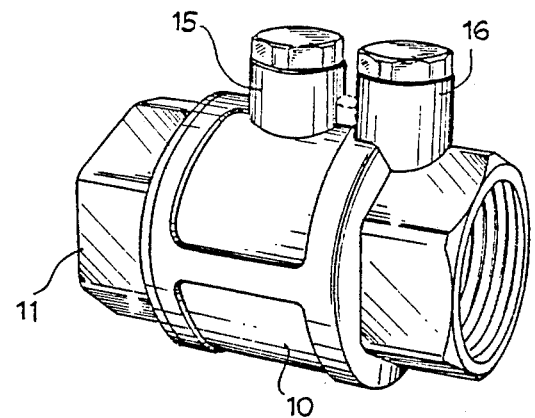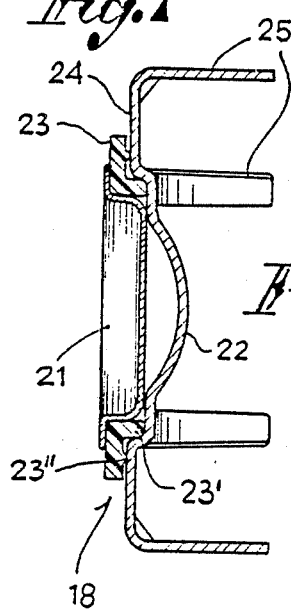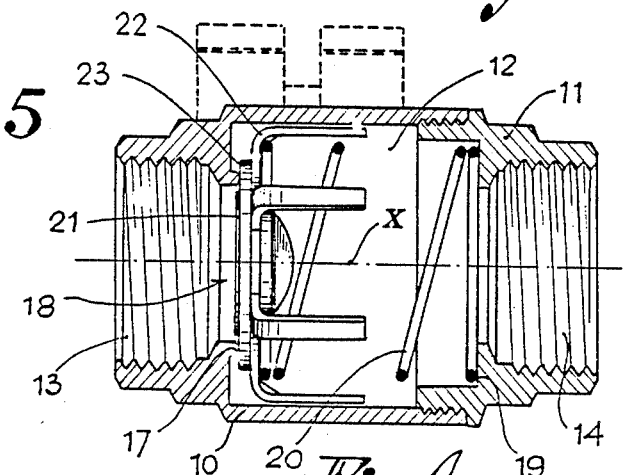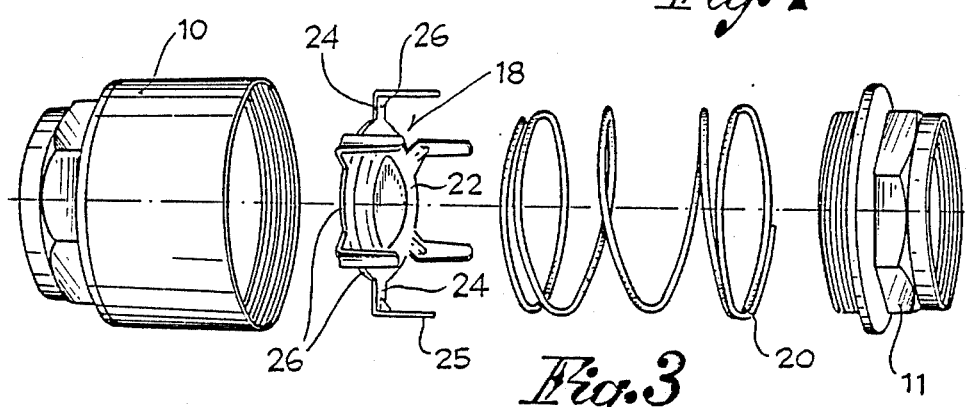

CHECK VALVE WITH SELF-GUIDED SHUTTER IN THE VALVE BODY

FIELD OF THE INVENTION

The present invention relates to a check valve which comprises a valve body defining an inlet and an outlet and a spring-actuated plate shutter positioned in the body interacting, through a gasket, with a valve seat provided between the inlet and the outlet, the valve body having optionally additional side ports for manometers, air purging or seal control.

DESCRIPTION OF THE PRIOR ART

Among the various types of check valves, there are known valves having a plate shutter interacting, by means of gaskets, with a valve seat, so as to allow a unidirectional flow of fluid and automatically prevent any flow in the direction opposite to that of delivery. According to the most common embodiments, the valve plate shutter may be of the type actuated by gravity or of the spring-loaded type. However, the guiding of the shutter in its internal displacements always necessitates specific means either directly provided in the valve body or introduced therein. In fact, according to the present technique, the plate shutter has an axial stem that is forced to run within complementary guiding means integral with or affixed to the valve body. This, besides causing manufacturing problems and cost increases, may create the inconvenient oblique positioning of the stem with respect to the guiding means, as a result of the fluid's pressure on the plate shutter. The interference of the stem with the guiding means impedes the correct displacements of the plate shutter, which furthermore is at present structurally quite complex and of laborious manufacture.

BRIEF DESCRIPTION OF THE INVENTION

It is, therefore, an object of the present invention to provide of check and delivery valve which comprises a plate shutter peripherically provided with means for the self-guiding of the shutter on the inner surface of the valve body. It is thus possible to advantageously eliminate the presence of any additional and complementary guide means directly provided on the valve body or attached thereto. It is, thus, also possible to simplify the structure and the assembly of the valve, reducing the number of its component parts, and to afford a more reliable and correct guide of the plate shutter, thus avoiding flutterings thereof.

It is another object of the present invention to provide a delivery check valve with a plate shutter of simpler manufacture, in that it is made of steel sheet metal with shearing operations between two complementary discs assembled by means of spot welding. These and other objects and advantages of the present invention are achieved with a check and delivery valve as claimed in claim 1.

BRIEF DESCRIPTION OF THE DRAWINGS

A more detailed description of the invention will become apparent from the following description thereof and from the accompanying drawings, in which:

FIGS. 1 and 2 are perspective views of a check valve, respectively, without and with additional radial or side ports;

FIG. 3 is a perspective, exploded view of a check valve;

FIG. 4 is a longitudinal sectional view of the assembly of the valve; and

FIG. 5 is an enlarged view of the plate shutter.

DETAILED DESCRIPTION OF THE INVENTION

The check valve of the invention comprises, generally, a body 10, to which is threaded a sleeve 11 for the combined definition of a chamber 12 that is in fluid communication with, on one side, an inlet port 13 for the delivery of a fluid, and on the opposite side, with an outlet port 14. The body 10 may optionally be provided with radial or side ports 15-16, as represented in FIG. 2 of the accompanying drawings. These additional ports are for manometers, for air purging and/or for chamber seal control.

In chamber 12, on the inlet side in the body, there is provided a valve seat 17 with which interacts a plate shutter 18. On the opposite side, that is in the sleeve 11, there is provided a shoulder 19, against which rests a preloaded spring 20.

Spring 20 acts on the plate shutter 18, so as to displace it and hold it in a closing position on the valve seat 17 when the delivery of the fluid through the check valve has ended.

The plate shutter 18 is formed of two superimposed discs 21-22, containing therebetween an annular gasket 23 of material suitable for the sealing of the valve seat 17. The discs 21-22 are of stainless steel and may be manufactured by means of shearing operations or profile turning operations and, when they are superimposed, they are attached to each other by means, for example, of spot welding, so as to partially enclose the sealing gasket 23, as shown in FIG. 5 of the accompanying drawings.

More particularly, a first disc, such as disc 21, has a diameter smaller than that of the valve seat 17, while the other disc 22 has a diameter greater than that of the first disc 21, but smaller than the inner diameter of the chamber 12. The annular gasket 23 has a central collar 23' which is constricted between the two discs 21-22 and on the surface of the gasket facing the larger disc 22 there is provided at least one annular rib 23" resting against the disc itself. The second disc 22 has, furthermore, radial arms 24, angularly spaced from one another, each arm ending in a small wing 25 angularly bent, so as to be parallel to the axis X of the plate and to extend in a direction opposed to the valve seat 17. The radial arms 24 define, among themselves, at the periphery of the disc, openings 26 for the fluid. The small wings 25, on the other hand, parallel to the X axis, are located on such a circumference that they rest, through a suitable play, on the inner surface of the chamber 12.

Thus, the plate shutter 18 is guided simply and easily, thanks to the small wings 25 which slidingly join the inner surface of the chamber 12. Such a guide system allows more suitable opening and closing displacements of the shutter, while preventing oblique positioning of the latter, even if subjected to non-equilibrated pressures. It will be also appreciated that the valve is composed of a more limited number of parts, thus simplifying both manufacture and assembly and reducing manufacturing costs.

While a specific embodiment of the invention has been shown and described in detail to illustrate the application of the principles of the invention, it will be understood that the invention may be embodied otherwise without departing from such principles.

What is claimed is:

1. A fluid delivery check valve, comprising: a valve body, a sleeve threaded on said valve body, said valve body and said sleeve defining a valve chamber; an inlet port and an outlet port associated with said valve body forming an inlet and an outlet to said valve chamber; a valve seat positioned between said inlet and said outlet; a spring-actuated plate shutter positioned in said chamber; an annular sealing gasket; said plate shutter being provided with wing portions parallel to a central axis of said shutter and slidingly interacting with an inner surface of said chamber for guiding the opening and closing displacements of said shutter, said valve seat interacting with said shutter through said gasket, said plate shutter including a pair of steel sheet metal disks superimposed on each other and welded to each other and partially enclosing therebetween said annular sealing gasket.

2. A fluid delivery check valve, comprising: a valve body, a sleeve threaded on said valve body, said valve body and said sleeve defining a valve chamber; an inlet port and an outlet port associated with said valve body forming an inlet and an outlet to said valve chamber; a valve seat positioned between said inlet and said outlet; a spring-actuated plate shutter positioned in said chamber; an annular sealing gasket; said plate shutter being provided with wing portions parallel to a central axis of said shutter and slidingly interacting with an inner surface of said chamber for guiding the opening and closing displacements of said shutter, said valve seat interacting with said shutter through said gasket, said plate shutter including a pair of steel sheet metal disks superimposed on each other and welded to each other and partially enclosing therebetween said annular sealing gasket, said pair of sheet metal disks includes a first disk and a second disk, said first disk having a diameter smaller than the diameter of said valve seat, said second disk having a diameter greater than the diameter of said first disk but smaller than the diameter of said chamber, said sealing gasket having a central collar constricted between said disks, when said disks are superimposed to each other and welded to each other, and said sealing gasket has an annular rib facing said second disk and resting on said second disk.

3. A fluid delivery check valve comprising: a valve body; a sleeve threadedly engaged with said valve body, said valve body and said sleeve defining a valve chamber, said valve body having an inlet port and an outlet port; a spring-actuated plate shutter positioned in said chamber; an annular sealing gasket; a valve seat positioned between said inlet and said outlet and interacting with said shutter through said gasket, said plate shutter having wing portions, parallel to a central axis of said shutter and slidingly interacting with an inner surface of said valve chamber for guiding the opening and closing displacements of said shutter, wherein said plate shutter includes a pair of sheet metal disks including a first disk having a diameter smaller than the diameter of said valve seat and a second disk having a diameter greater than the diameter of said first disk but smaller than the inner diameter of said chamber, said sealing gasket having a central collar constricted between said first disk and said second disk, said first and second disks being superimposed on each other and welded to each other, said sealing gasket having an annular rib facing and resting on said second disk.

4. A fluid delivery check valve according to claims 3 or 2, wherein: said second disk includes a plurality of angularly spaced radial arms defining openings between respective adjacent radial arms, each of said radial arms having a small wing which is angularly bent, facing said valve seat parallel to the axis of said shutter and sliding on the inner surface of said chamber.

* * * * *